United States Patent [19]

Lai

[11] Patent Number: 5,234,023

[45] Date of Patent: Aug. 10, 1993

[54] PRESSURE RELIEF VALVE WITH AUXILIARY LOADING DEVICE

[75] Inventor: Ying-San Lai, Alexandria, La.

[73] Assignee: Dresser Industries, Dallas, Tex.

[21] Appl. No.: 843,853

[22] Filed: Feb. 27, 1992

[51] Int. Cl.⁵ ............................................. F16K 17/10
[52] U.S. Cl. ..................................... 137/489; 137/478
[58] Field of Search .................. 137/469, 475–478, 137/489

[56] References Cited

U.S. PATENT DOCUMENTS

| | | |
|---|---|---|
| 46,142 | 1/1865 | Riordan . |
| 231,214 | 8/1880 | Curtis ............................ 137/489 |
| 1,155,076 | 9/1915 | Melcher . |
| 1,231,280 | 6/1917 | Metten ........................ 137/489 X |
| 1,364,061 | 12/1920 | Jones . |
| 1,893,462 | 1/1933 | Wait . |
| 2,227,629 | 1/1941 | Cannon . |
| 2,274,663 | 3/1942 | Brisbane . |
| 2,905,432 | 9/1959 | Mercier . |
| 3,211,174 | 10/1965 | Weise ............................ 137/489 X |
| 3,238,966 | 3/1966 | Howard et al. . |
| 4,019,125 | 4/1977 | Daniel . |
| 4,130,130 | 12/1978 | Stewart ............................ 137/475 |
| 4,210,214 | 7/1980 | Blanton . |
| 4,250,913 | 2/1981 | Scull . |
| 4,284,212 | 8/1981 | Caswell . |
| 4,595,033 | 6/1986 | Walsh, Jr. . |
| 4,722,361 | 2/1988 | Reip . |
| 4,791,955 | 12/1988 | Reip . |
| 4,858,642 | 8/1989 | Fain, Jr. . |
| 4,881,571 | 11/1989 | Reip . |
| 4,917,144 | 4/1990 | Giles . |
| 4,958,656 | 9/1990 | Patel . |
| 4,966,184 | 10/1990 | Giles . |
| 5,009,246 | 4/1991 | Giles . |

*Primary Examiner*—Robert G. Nilson
*Attorney, Agent, or Firm*—Haynes and Boone

[57] ABSTRACT

A pressure relief valve including a valve member movable between open and closed positions to control fluid flow. A body member is provided which receives a piston operatively connected to the valve member for operating same. The piston defines a first chamber in the valve body extending above the piston and a second chamber extending below the piston. System fluid is introduced into the chambers and the differential fluid pressure in the chambers applies a loading force to the piston, and therefore to the valve member in its closed position. When the system pressure, and therefore the pressure in the chambers, exceeds a predetermined amount the pressure in one of the chambers is vented, causing the piston to move to an open position and permit opening movement of the valve member.

18 Claims, 1 Drawing Sheet

PRESSURE RELIEF VALVE WITH AUXILIARY LOADING DEVICE

BACKGROUND OF THE INVENTION

This invention relates to a pressure relief valve and, more particularly, to a pressure relief valve in which an additional loading force is applied to its valve member.

Pressure responsive relief valves are used in many applications t prevent operating systems utilizing pressurized fluid from reaching dangerously high pressures. Such valves usually include a nozzle having a valve seat which is normally closed by a valve member slidably disposed in the body of the valve. The valve member typically is biased to a closed position against the valve seat by a compression spring, or the like. When the system pressure exceeds a predetermined set value, the valve member opens and places the nozzle passage in fluid communication with an exhaust port in the valve body. When the pressure in the nozzle passage then decreases by a specified incremental amount to arrive at the reseating pressure for the valve, the valve member is again forced into a seated position on the valve seat under the action of the compression spring to close the valve.

In these types of arrangements, the valve member must seat very tightly on the valve seat to prevent leakage, particularly at pressures approaching the set pressure of the valve, and several techniques have evolved to improve seat tightness. For example, the valve members are provided with a highly machined replaceable disc formed of stainless steel, or like material, which engages a highly machined contacting surface of the valve seat. Also, the valve seats are machined to relatively narrow widths which offer a small contact area with the disc member.

Another technique for achieving even greater seat tightness involves the use of a so-called "soft seat" valve configuration in which a resilient O-ring, or the like, is secured to the valve member so that contact between the outer edge of the valve seat and the O-ring provides a sealing function. However, these soft seat valves are not as durable as valves provided with the machined metal surfaces.

Still other techniques for improving seat tightness involve additional loading to the valve member utilizing external energy. However, these techniques are often complicated, not fail safe and add to the cost of the system.

Therefore, it is still a goal of designers to provide pressure relief valves with increased seal tightness, decreased fluid leakage, and increased durability without attendant increases in complexity and cost.

SUMMARY OF THE INVENTION

It is therefore an object of the invention to provide a pressure relief valve for controlling fluid flow in which additional loading is placed on the valve to increase seat tightness and reduce fluid leakage.

It is a further object of the present invention to provide a pressure relief valve of the above type in which the additional loading is achieved utilizing the pressure of the fluid.

It is a further object of the present invention to provide a pressure relief valve of the above type which responds quickly and reliably to a predetermined fluid pressure for releasing the additional loading to permit the valve to open.

It is a still further object of the present invention to provide a pressure relief valve of the above type which does not expend any external energy.

It is a still further object of the present invention to provide a pressure relief valve of the above type which is durable.

Toward the fulfillment of these and other objects, the pressure relief valve of the present invention comprises a valve member movable between open and closed positions to control fluid flow in a system. A piston is operatively connected to the valve member and defines a first chamber in the valve body extending above the piston and registering with an inlet in the valve body, and a second chamber extending below the piston and registering with another inlet. The system fluid is introduced through the inlets and into the chamber and the differential fluid pressure force in the chambers creates a loading force on the piston, and therefore on the valve member. When the system pressure, and therefore the pressure in the chambers, exceeds a predetermined amount, the pressure in one of the chambers is vented, causing the piston to move to an open position.

BRIEF DESCRIPTION OF THE DRAWINGS

The above brief description, as well as further objects, features and advantages of the present invention will be more fully appreciated by reference to the following detailed description of the presently preferred but nonetheless illustrative embodiments in accordance with the present invention when taken in conjunction with the accompanying drawings wherein.

DETAILED DESCRIPTION OF THE INVENTION

Figures 1, 2, 3:
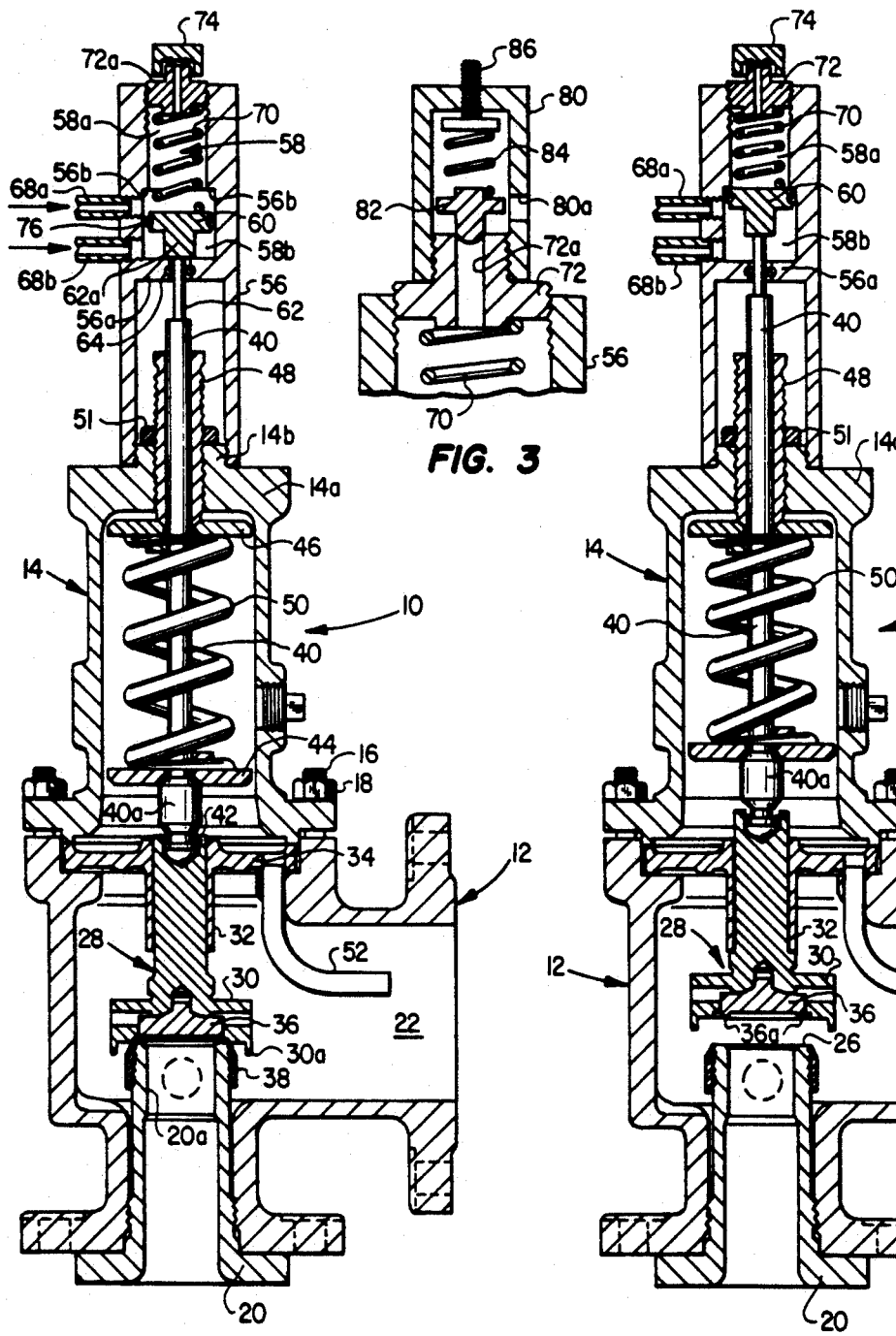
FIG. 1 is a cross-sectional view depicting the pressure relief valve of the present invention shown in a closed position.
FIG. 2 is a view similar to FIG. 1 but depicting the valve of FIG. 1 in an open position.
FIG. 3 is a partial cross-sectional view of an alternate embodiment of the pressure relief valve of the present invention.

Referring to FIGS. 1 and 2 of the drawings, the reference numeral 10 refers in general to a pressure relief valve which includes a base member 12 and a bonnet member 14 secured to the base member by a plurality of bolts 16 extending through aligned openings in the members 12 and 14 and receiving a plurality of nuts 18. The base member 12 is provided with an inlet nozzle 20 which is connected to a source of fluid whose flow is to be controlled, and an exhaust port 22 through which the fluid is expelled when the valve 10 is in its open position. The nozzle 20 defines an internal bore, or passage 20a which terminates in an enlarged opening to define a valve seat 26 (FIG. 2). The base member 12 and the bonnet member 14 define an internal chamber which receives a valve unit 28 which is mounted for reciprocal movement in the chamber. The valve member 28 includes a disc holder 30 which is slidably disposed within a guide sleeve 32 coaxially mounted in the base member 12 by a transverse mounting plate 34 secured between the base member 12 and the bonnet member 14. The disc holder 30 supports a disc 36 having a machined face 36a (FIG. 2) which, in the closed position of the valve member 28 shown in FIG. 1, rests upon the valve seat 26. The disc holder 30 is provided with an annular skirt 30a which projects downwardly from the disc holder and defines with a adjustment ring 38 threadedly engaged to the outer surface of the nozzle 20, an adjustment orifice for regulating the blowdown, or reseating, pressure of the valve as will be described.

The valve unit 28 also includes a spindle 40 provided at its lower end with an enlarged head 40a the lower portion of which is seated in a corresponding recess at the upper end of the disc holder 30 and is retained therein by means of a split retaining ring 42. A washer 44 extends over the lower end portion of spindle 40 and rests upon the shoulder defined by the head 40a. A washer 46 extends over the upper end portion of the spindle and is limited in upward movement by the bottom shoulder of an adjusting screw 48 which is threaded within a top plate 14a of the bonnet member 14.

A compression spring 50 extends over the spindle 40 and is interposed between the washers 44 and 46. The compressive force exerted by the spring 50 ca be adjusted by moving the adjustment screw 48, and therefore the washer 46, up or down as viewed in the drawings. A nut 51 engages the upper end of the screw 48 to retain the screw at a desired position corresponding to the amount of compressive force exerted by the spring 50.

An eductor tube 52 is provided within the interior of the base member 12 and has one end secured in an opening in the transverse plate 34 and the other end extending into the exhaust port 22. The eductor tube 52 thus communicates with the interior of the bonnet member 14 and functions to remove fluid that leaks into the interior of the bonnet member by a syphon effect created by the fluid flow through the port 22. The above components of the pressure relief valve 10, along with further details, are fully disclosed in U.S. Pat. No. 4,858,642 assigned to the assignee of the present invention, the disclosure of which is incorporated by reference.

A housing 56 is mounted over the upper portion of the bonnet member 14 and is connected to, and in threaded engagement with, a circular flange 14b extending from the top plate 14a of the bonnet member 14. The lower portion of the housing 56 receives the upper end portion of the spindle 40, and a horizontal partition 56a extends across the interior of the housing 56 to define an operating chamber 58 in the upper portion of the housing which receives a piston 60. A stem 62 extends from the lower surface of the piston 60 and through an opening extending through the partition 56a, and its lower end abuts the upper end of the spindle 40. The stem 62 includes an enlarged portion 62a which, before the housing 56 is mounted to the plate 14a, rests on the upper surface of the partition 56a. An O-ring 64 is disposed in a corresponding groove provided in the wall of the partition 56a defining the opening in the partition to seal against fluid leakage from the chamber 58.

Two inlet conduits 68a and 68b extend through corresponding openings in the housing 56 and register with the chamber 58. It is understood that the conduits 68a and 68b are connected to the same source of fluid that is being controlled by the pressure relief valve 10, i.e. the same source that is connected to the inlet of the nozzle 20.

In the closed position of the valve unit 28 shown in FIG. 1, the piston 60 is positioned between the inlet conduits 68a and 68b so that the chamber 58 is divided into an upper portion 58a extending above the piston 60 and a lower portion 58b extending below the piston. A spring 70 is provided in a bore formed in the upper chamber portion 58a and extends between the piston 60 and a plug 72 in threaded engagement with the upper end portion of the latter bore. This bore is stepped to define a shoulder 56b against which the upper surface of the piston 60 abuts when the piston is in its open position of FIG. 2, as will be further described. The axial position of the plug 72 in the bore can thus be varied to vary the force exerted by the spring 70 on the piston 60. The plug 72 is provided with an outlet passage 72a over which a dead weight vent cap 74 extends to vent the upper chamber portion 58a under predetermined conditions that will be described.

The piston 60 is adapted for reciprocal movement within the chamber 58 and an O-ring 76 extends in a circular groove formed in the outer circumference of the piston which engages the corresponding inner wall of the body member 56 to prevent fluid leakage between the chamber portions 58a and 58b. The upper surface of the piston 60 exposed to the fluid in the chamber portion 58 is greater than the lower surface of the piston exposed to the pressure in the lower chamber portion 58b due to the presence of the valve stem 62. Thus, the downward force exerted on the piston 60 by the fluid in the chamber portion 58a is greater than the upward force exerted on the piston by the fluid in the chamber portion 58b, with the spring 70 providing some additional downward force against the piston 60. Thus, the piston 60 is normally forced to its closed position in the lower portion of the chamber 58 a shown in FIG. 1 by the action of the force exerted by the fluid pressure in the upper chamber portion 58a in excess of that exerted by the fluid pressure in the lower chamber portion 58b and by the action of the spring 70.

In operation, the nozzle 20, as well as the inlet conduits 68a and 68b, are connected to the source of fluid to be controlled. The vent ca 74 is selected and the spring 50 is adjusted by rotation of the screw 48 so that the vent cap and the valve member 28 respond to a predetermined pressure of the system fluid. Assuming that the latter fluid pressure does not exceed the predetermined value, the spring 50 acts against the valve member 28 to force it to its closed position in the sealing relationship with the valve seat 26 shown in FIG. 1, thus preventing the flow of the fluid through the nozzle 20, the interior of the base member 12 and out the exhaust port 22. Also, the piston 60 is forced to its lower, closed position of FIG. 1 by the differential fluid pressure in the upper chamber portion 58a and the lower chamber portion 58b, along with the force of the spring 70. Thus the piston 60, and therefore the stem 62, act against spindle 40 to provide an additional downwardly-directed loading force to the valve member 28 to maintain it in its closed position of FIG. 1 and to provide an increased loading on the seal between the machined face 36a of the disc 36 and the valve seat 26.

When the pressure of the system fluid exceeds the predetermined value, causing a corresponding increase in the fluid pressure in the chamber portion 58a, the vent cap 74 opens to relieve the fluid pressure in the upper chamber portion 58a. The design is such that the above-mentioned predetermined pressure creates an upward force applied to the piston 60 by the fluid in the lower chamber portion 58b which force is greater than the downward force applied by the spring 70. Therefore, the downward force exerted on the spindle 40 by the piston 60, via the stem 62, is eliminated and the piston is forced upwardly to the position shown in FIG. 2 in which it abuts the shoulder 56b. This predetermined pressure of the system fluid also applies an upward force against the valve unit 28 which exceeds that of the compression spring 50, and the valve unit 28 moves to its open position shown in FIG. 2. In this position the system fluid is permitted to flow through the nozzle 20, the interior of the base member 12 and exit through the exhaust port 22.

It is noted that, in the open position of FIG. 2, the piston 60 is positioned above the inlet conduit 68a and the corresponding opening in the body member 56, thus shutting off the fluid flow into the upper chamber portion 58a. Therefore, this eliminates the unnecessary flow of the high pressure fluid through the chamber portion 58a and the open vent cap 74.

The valve unit 28 will stay in its open position of FIG. 2 until the fluid pressure drops down to a predetermined reseat pressure causing movement of the spindle 40 and movement of the valve member 28 downwardly to the closed position of FIG. 1 under the action of the force provided by the spring 50. Also, since the force exerted on the piston 60 by the spring 70 can be adjusted by rotating the plug 72 so that this reseat pressure reduces the force in the lower chamber portion 58b to a value which is less than the force applied to the piston 60 by the spring 70 and pressure in the upper chamber portion 58a, the piston moves back towards the position of FIG. 1 under the force of the spring. This permits the system fluid to enter the upper chamber portion 58a through the inlet conduit 68a which fluid, together with the force of the spring 70, again applies the additional downward loading force to the valve unit 28, via the stem 62 and the spindle 40.

The adjustment ring 38 ca be rotated to adjust its axial position on the nozzle 20 to regulate the size cf the adjustment orifice defined between the skirt 30a of the disc holder 30 and the ring 38, to regulate the reseat pressure of the valve, as described in the above-referenced patent.

It is thus seen that the pressure relief valve of the present invention applies an additional seat-engaging, loading force to the valve member 28 to provide a very high degree of seat tightness. Also, the valve of the present invention responds quickly and reliably to the existence of the predetermined threshold system fluid pressure for instantly relieving the force and permitting opening of the valve member. Further, the valve of the present invention is relatively simple in structure and operation and utilizes the system fluid instead of external energy.

FIG. 3 depicts an alternate embodiment of the pressure relief valve of the present invention in which the vent cap 74 is replaced by an adjustable, spring-loaded valve. More particularly, an externally-threaded circular flange 72a is provided on the plug member 72 of the previous embodiment and a sub-housing 80 is mounted over the plug member 72 with its lower end position in threaded engagement with the flange 72a. A valve member 82 is located in the sub-housing 80 and is normally forced by a spring 84 into engagement with a seat defined by the upper surface of the flange 72a to block the upper end of the outlet passage 72a. The spring 84 extends between the valve member 82 and the head of a bolt member 86 which is in threaded engagement with an opening formed through the upper end of the sub-housing 80. Thus, the axial position of the bolt member 86 can be adjusted to vary the force exerted on the valve member 82 by the spring 84. An opening 80a extends through the wall of the sub-housing 80 to provide a outlet for the fluid venting from its chamber 58a.

The force exerted on the valve member 82 by the spring 84 can be set so that, when the pressure of the system fluid exceeds the above-mentioned predetermined value causing a corresponding increase in the fluid pressure in the upper chamber portion 58a, the valve member 82 opens against the force of the spring 84. This enables the high pressure fluid to pass from the chamber 58a, through the passage 72a and the interior of the sub-housing 80 and discharge through the outlet opening 80a. Otherwise, the structure, operation and advantages of the embodiment of FIG. 3 are identical to those of FIGS. 1 and 2.

It is understood that other variations may be made in the foregoing without departing from the scope of the invention. For example, the stem 62 of the piston 60 can be attached to the spindle 40 in which case the device of the present invention would also provide a pulling force on the valve member 28 under the conditions described above to assist the disc 36 to open.

Still other variations, modifications, changes and substitutions are intended in the foregoing disclosure and in some instances some features of the invention will be employed without a corresponding use of other features. Accordingly, it is appropriate that the appended claims be construed broadly and in a manner consistent with the scope of the invention.

What is claimed is:

1. A pressure relief valve assembly, comprising:
   a valve member moveable between open and closed positions to control fluid flow;
   means for applying a first force to said valve member to normally move it to one of said positions;
   a housing having two inlets for introducing said fluid into said housing and an outlet for venting said fluid;
   a piston operatively connected to said valve member and responsive to the pressure of said fluid introduced to said housing via said inlets to apply a second force against said valve member, said piston mounted for reciprocal movement in said housing and defining therewith a first chamber extending above said piston registering with one of said inlets and said outlet and a second chamber extending below said piston registering with the other of said inlets, said fluid pressure in said chambers creating oppositely-directed forces on the respective ends of said piston, wherein said force applied to said piston by said fluid pressure in said first chamber is greater than the force applied to said piston by said fluid pressure in said second chamber causing said piston to move to a position in which it operatively engages said valve member; and
   means responsive to the pressure of said fluid exceeding a predetermined value for releasing said second force by venting said fluid in said first chamber to release said force applied to said piston by said fluid pressure in said first chamber.

2. The assembly of claim 1 wherein said one position is a closed position and wherein said first force-applying means responds to said predetermined fluid pressure for permitting said valve member to move to said open position.

3. A pressure relief valve assembly, comprising:
   a valve member moveable between open and closed positions to control fluid flow;

means for applying a first force to said valve member to normally move it to one of said positions;
a housing for receiving said fluid;
means for introducing said fluid into said housing;
a piston operatively connected to said valve member and responsive to the pressure of said fluid introduced to said housing via said introducing means to force said piston to a position in which it operatively engages said valve member to apply a second force against said valve member, said piston mounted for reciprocal movement in said housing and defining therewith a first chamber extending above said piston and a second chamber extending below said piston, said fluid-introducing means introducing said fluid into said chambers so that the fluid pressure in said chambers creates oppositely-directed forces on the respective ends of said piston, wherein said force applied to said piston by said fluid pressure in said first chamber is greater than the force applied to said piston by said fluid pressure in said second chamber forcing said piston to said engaging position;
a spring means disposed in said first chamber and acting on the corresponding end of said piston to apply a force against said piston;
means responsive to the pressure of said fluid exceeding a predetermined value for venting said fluid in said first chamber to release said force applied to said piston by said fluid pressure in said first chamber such that the force applied to said piston by the fluid pressure in said second chamber exceeds the force applied to said piston by said spring means to move said piston to a position in response to said venting in which it releases said second force; and
means responsive to said piston moving to said force-releasing position for terminating said introduction of fluid to said first chamber.

4. The assembly of claim 3 wherein said second force-applying means includes an extensible mechanical device.

5. The assembly of claim 3 wherein said first force-applying means is adjustable and said second force-applying means is adjustable independently of the adjustment of said first force-applying means.

6. The apparatus of claim 3 wherein said second force-applying means applies said second force against said valve member in the same direction as that of said first force-applying means.

7. A pressure release valve apparatus, comprising:
a valve member moveable between open and closed positions to regulate fluid flow;
means for applying a first force to said valve member to move it to one of said positions;
a housing having two inlets for introducing said fluid into said housing and an outlet for venting said fluid;
a piston mounted for reciprocal movement in said housing for applying a second force against said valve member, said piston defining with said housing a first chamber extending above said piston registering with one of said inlets and said outlet and a second chamber extending below said piston registering with the other of said inlets, said fluid pressure in said chambers applying forces on the respective ends of said piston, wherein said force applied to said piston by said fluid pressure in said first chamber is greater than the force applied to said piston by said fluid pressure in said second chamber causing said piston to move to a position in which it operatively engages said valve member;
means responsive to the pressure of said fluid exceeding a predetermined value for releasing said second force by venting said fluid in said first chamber to release said force applied to said piston by said fluid pressure in said first chamber; and
means for adjusting said predetermined value.

8. The apparatus of claim 7 wherein said one position is a closed position and wherein said first force-applying means responds to said predetermined value for permitting said valve member to move to said open position.

9. The apparatus of claim 7 wherein the area of one end of said piston exposed to said fluid in said one chamber is greater than the area of said piston exposed to said fluid in said other chamber to create said greater force.

10. A pressure release valve apparatus, comprising:
a valve member moveable between open and closed positions to regulate fluid flow;
means for applying a first force to said valve member to move it to one of said positions;
a housing for receiving said fluid;
means for introducing said fluid into said housing;
a piston mounted for reciprocal movement in said housing for applying a second force against said valve member, said piston defining with said housing a first chamber located above said piston and a second chamber located below said piston, said fluid-introducing means introducing said fluid into said chambers so that the fluid pressure in said chambers applies forces on the respective ends of said piston, wherein said force applied to said piston by said fluid pressure in said first chamber is greater than the force applied to said piston by said fluid pressure in said second chamber forcing said piston to a position in which it operatively engages said valve member;
an extensible mechanical device disposed in said first chamber and acting on the corresponding end of said piston to apply a force against said piston;
means responsive to the pressure of said fluid exceeding a predetermined value for venting said fluid in said first chamber to release said force applied to said piston by said fluid pressure in said first chamber such that the force applied to said piston by the fluid pressure in said second chamber exceeds the force applied to said piston by said extensible mechanical device to move said piston to a position in response to said venting in which it releases said second force; and
means responsive to said piston moving for terminating said introduction of fluid to said first chamber.

11. The apparatus of claim 10 wherein said first force-applying means is adjustable and said second force-applying means is adjustable independently of the adjustment of said first force-applying means.

12. The apparatus of claim 10 wherein said second force-applying means applies said second force against said valve member in the same direction as that of said first force-applying means.

13. The apparatus of claim 12 wherein said one position is a closed position and wherein said first force-applying means responds to the pressure of said fluid for permitting said valve member to move to said open position.

14. A pressure relief valve assembly, comprising:
a valve member moveable between open and closed positions to control fluid flow;

means for applying a first force to said valve member to normally move it to one of said positions;
means in a spaced relationship to said valve member for generating a second force, said second force-generating means comprising:
   a housing having two inlets for introducing said fluid into said housing and an outlet for venting said fluid; and
   a piston mounted for reciprocal movement in said housing and defining therewith a first chamber located above said piston registering with one of said inlets and said outlet and a second chamber extending below said piston registering with the other of said inlets, said fluid pressure in said chambers applying forces on the respective ends of said piston, wherein said force applied to said piston by said fluid pressure in said first chamber is greater than the force applied to said piston by said fluid pressure in said second chamber forcing said piston in one direction;
   wherein said second force-generating means vents said fluid in said first chamber to release said force applied to said piston by said fluid pressure in said first chamber; and
   a shaft operatively connecting said valve member and said piston for transmitting said second force to said valve member to force said valve member to said one position.

15. The apparatus of claim 14 wherein the area of one end of said piston exposed to said fluid in said one chamber is greater than the area of said piston exposed to said fluid in said other chamber to create said greater force.

16. A pressure relief valve assembly, comprising:
a valve member moveable between open and closed positions to control fluid flow;
means for applying a first force to said valve member to normally move it to one of said positions;
mean sin a spaced relationship to said valve member for generating a second force, said second force-generating means comprising:
   a housing for receiving said fluid;
   means for introducing said fluid into said housing; and
   a piston mounted for reciprocal movement in said housing and defining therewith a first chamber located above said piston and a second chamber extending below said piston, said fluid-introducing means introducing said fluid into said chambers so that the fluid pressure in said chambers applies forces on the respective ends of said piston, wherein said force applied to said piston by said fluid pressure in said first chamber is greater than the force applied to said piston by said fluid pressure in said second chamber forcing said piston in one direction;
   wherein said second force-generating means vents said fluid in said first chamber to release said force applied to said piston by said fluid pressure in said first chamber;
a shaft operatively connecting said valve member and said second force-generating means for transmitting said second force to said valve member to force said valve member to said one position;
an extensible mechanical device disposed in said first chamber and acting on the corresponding end of said piston to apply a force against said piston, wherein upon said venting, the force applied to said piston by said fluid pressure in said second chamber exceeds the force applied to said piston by said extensible mechanical device to move said piston and release said second force; and
means responsive to said piston moving for terminating said introduction of fluid to said first chamber.

17. The apparatus of claim 16 wherein said first force-applying means is adjustable and said second force-generating means is adjustable independently of the adjustment of said first force-applying means.

18. The apparatus of claim 16 wherein said second force-generating means applies said second force against said valve member in the same direction as that of said first force-applying means.

* * * * *

UNITED STATES PATENT AND TRADEMARK OFFICE
CERTIFICATE OF CORRECTION

PATENT NO. : 5,234,023

DATED : August 10, 1993

INVENTOR(S) : Ying-San Lai

It is certified that error appears in the above-identified patent and that said Letters Patent is hereby corrected as shown below:

Column 1, line 10, change "t" to --to--.
Column 2, line 18, change "chamber" to --chambers--.
Column 3, line 2, change "a" to --an--.
Column 3, line 20, change "ca" to --can--.
Column 4, line 38, change "ca" to --cap--.
Column 5, line 35, change "ca" to --can--.

Claim 16, Column 9, line 38, change "mean sin" to --means in--.

Signed and Sealed this

Twelfth Day of April, 1994

Attest:

BRUCE LEHMAN

*Attesting Officer*  *Commissioner of Patents and Trademarks*